Aug. 22, 1950     M. C. BEANE     2,519,815
AUTOMOBILE BATTERY CIRCUIT BREAKER
Filed Sept. 30, 1947
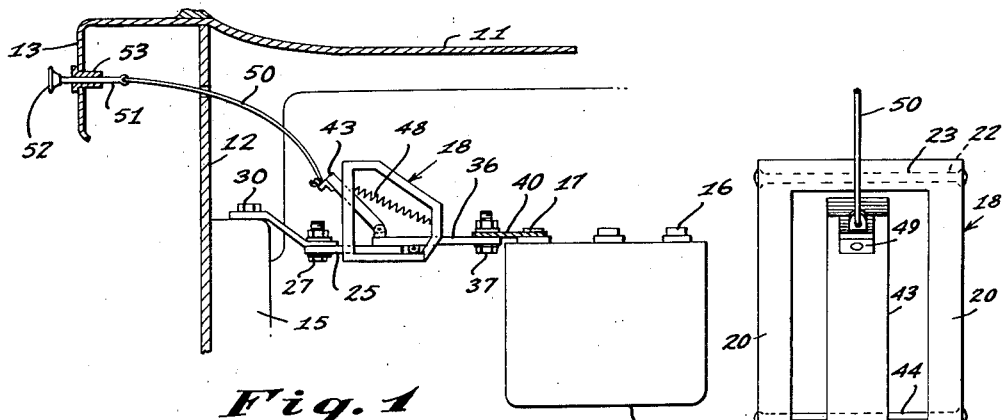
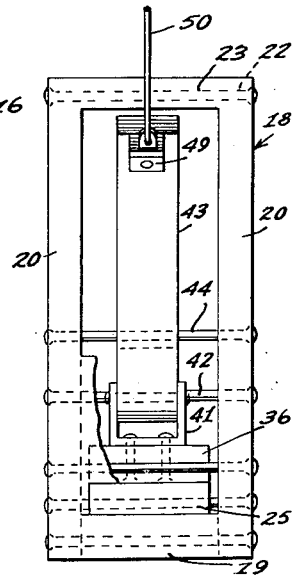
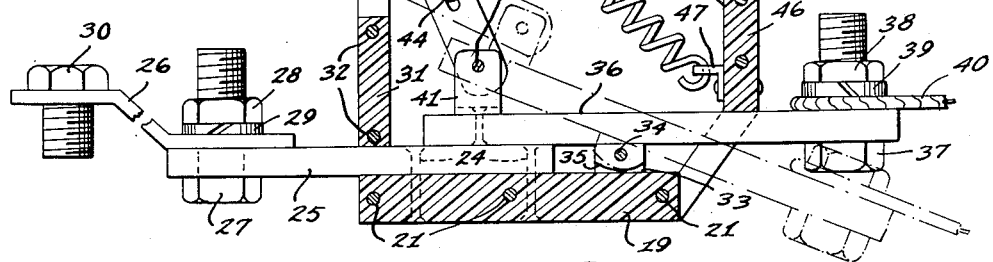
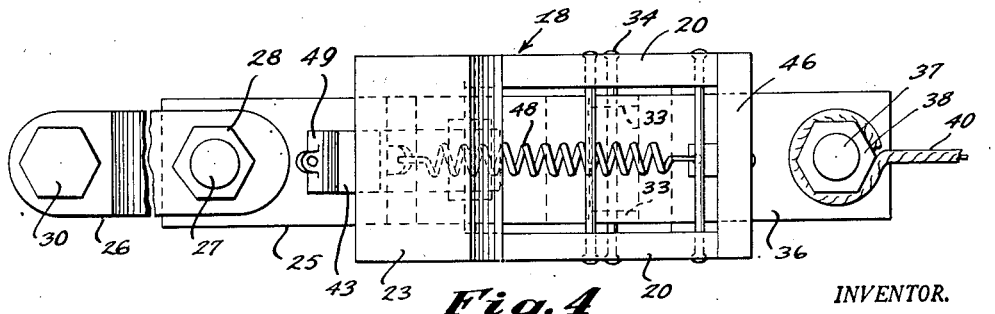
INVENTOR.
MILAM C. BEANE
BY
McMorrow, Berman & Davidson
ATTORNEYS Patented Aug. 22, 1950

2,519,815

UNITED STATES PATENT OFFICE 2,519,815

AUTOMOBILE BATTERY CIRCUIT BREAKER

Milam C. Beane, Newport, Ohio

Application September 30, 1947, Serial No. 776,895

2 Claims. (Cl. 200—165)

This invention relates to circuit makers and breakers, and more particularly to a circuit breaker for automobile batteries adapted to positively open the battery circuit to prevent fires caused by short circuits in the automobile wiring system.

A main object of the invention is to provide a novel and improved circuit breaker for automobile batteries which is very simple in construction, easy to install and reliable in operation.

A further object of the invention is to provide an improved battery circuit breaker for motor vehicle wiring systems which is inexpensive to manufacture, extremely rugged in construction, and easy to control.

Further objects and advantages of the invention will become apparent from the following description and claims, and from the accompanying drawings, wherein:

Figure 1 is a cross-sectional view taken through an automobile dashboard and fire wall, showing a circuit breaker constructed according to the present invention installed in the ground connection of the automobile battery.

Figure 2 is an enlarged vertical longitudinal cross-sectional view taken through the circuit breaker structure of Figure 1.

Figure 3 is an enlarged end elevational view, partly broken away, of the circuit breaker structure of Figure 1.

Figure 4 is a top plan view of the circuit breaker structure shown in Figures 2 and 3.

Referring to the drawings, 11 designates the motor compartment of an automobile, the fire wall at the end of said compartment being shown at 12 and the automobile dashboard being shown at 13. Suitably mounted, by conventional means not shown, in the motor compartment 11 is the automobile battery 14. Designated at 15 is the engine starting motor. One terminal of the motor 15 is connected through a conventional starter switch, not shown, to a battery terminal post 16. The other terminal of the motor 15 is grounded to its housing, which is electrically bonded to the automobile frame, as by its mechanical connection to the automobile engine block.

The remaining battery terminal 17 is connected to the starter motor housing through a manually controlled circuit breaker designated generally at 18.

Circuit breaker 18 comprises a horizontally disposed base plate 19 of rigid insulating material to which are secured vertical side walls 20, 20, also of insulating material, by means of transverse rivets 21. Secured between the top portions of side walls 20, 20 by means of transverse rivets 22 is a top wall 23, of insulating material. Secured to base plate 19 by vertical rivets 24, 24, and projecting rearwardly therefrom is a bar member 25 of copper or other suitable conductive material. A horizontally disposed rigid strap 26, of conductive material, is connected at one end to the rearwardly projecting end of bar member 25 by a bolt 27, nut 28 and lock washer 29. The other end of strap 26 is connected by a bolt 30 to the housing of starter motor 15. A vertical rear wall section 31 of insulating material overlies bar member 25 and is secured between side walls 20, 20 by rivets 32.

Projecting upwardly from base plate 19 forwardly adjacent the forward end of bar member 25 are lugs 33, 33. Pivotally connected between said lugs 33, 33 by a transverse pin 34 is the depending lug 35 carried by a bar member 36 of conductive material such as copper, or the like. The forward end of bar member 36 is connected by a bolt 37, nut 38 and lock washer 39 to one end of a flexible conductor 40. The other end of conductor 40 is connected to the battery terminal 17, so that when bar member 36 is in contact with bar member 25, as shown in full line view in Figure 2, the battery terminal 17 is grounded to the starter motor housing.

Secured to the rear end of bar member 36 is a U-shaped bracket 41 and pivotally connected between the upstanding arms of said bracket by a transverse pin 42 is the lower end of a lever member 43 of insulating material. Lever member 43 is pivotally carried at its lower intermediate portion between the side walls 20, 20 on a transverse rivet 44 secured to said side walls. Secured to the top end portion of lever member 43 is an apertured bracket 45. Secured between the forward ends of side walls 20, 20 is a front wall 46 of insulating material. Secured to the lower portion of said front wall is an apertured bracket 47. A coiled spring 48 is connected between brackets 45 and 47, biasing the lever member 43 to a raised position wherein bar member 36 engages bar member 25.

Secured to the top end portion of lever member 43 opposite bracket 45 is another apertured bracket 49. Secured to bracket 49 is the end of a semi-rigid shaft 50. The other end of shaft 50 is connected to a push rod 51 slidably mounted on the dashboard 13 and provided with a push button 52 for manipulation thereof. Rod 51 is mounted in a supporting sleeve 53 providing a substantial frictional engagement with the rod, whereby manual effort is required to move the rod in said sleeve. When the push button 52 is pulled outwardly lever member 43 is rotated in a counter clockwise direction, as viewed in Figure 2, to the dotted line position shown therein, causing bar member 36 to rotate clockwise around pin 34. This disconnects bar member 36 from bar member 25 and opens the battery ground circuit. When the button 52 is pushed inwardly, the lever member 43 returns to the full line position shown in Figure 2, aided by spring 48, and causes bar member 36 to engage bar member 25, thus closing the battery ground circuit.

It is thus seen that when a short circuit in the automobile wiring occurs, the battery ground circuit may be quickly opened by pulling button 52 outwardly. The friction sleeve 53 maintains the push rod 51 in its outwardly adjusted position until manual pressure is applied to the push button 52 to return said rod 51 inwardly. The spring 48 aids the return movement of bar member 36 and insures substantially positive contact thereof with the stationary bar member 25.

While a specific embodiment of a circuit breaking device for automobile battery systems has been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. A circuit breaker comprising a flat insulated base, a flat contact bar secured along one side of said base, insulated sidewalls projecting from said base along opposite sides of said contact bar, a transverse pivot extending between said sidewalls in spaced relation over said contact bar, a lever freely pivoted intermediate its ends on said pivot, and a flat contactor bar pivoted intermediate its ends on said base at one end of said contact bar whereby in one position an end of said contactor bar overlies said contact bar in facial contact therealong, pivot means operatively connecting one end of said lever with the said one end of said contactor bar, and spring means operating between the other end of said lever and a portion of said base on the opposite side of the pivotal axis of said contactor bar from said lever.

2. A circuit breaker comprising an insulated base comprising a flat plate having spaced longitudinal sidewalls projecting on one side thereof, a flat contact bar positioned between said sidewalls and secured to extend along said one side of the plate from one end of said plate to a point spaced from the opposite end of said plate, a lug projecting from said one side of the plate between the said opposite end of the plate and the adjacent end of said contact bar, a contactor arm between said sidewalls and pivoted intermediate its ends on said lug on an axis traverse of said plate whereby said contactor bar can occupy a normal position in which one end of said contactor bar overlies said contact bar in facial contact therealong and another position in which said contactor bar is tilted out of contact with said contact bar, an operating lever positioned between said sidewalls and pivoted on said base to swing in the plane of swing of said contactor bar on an axis laterally spaced from said contact bar, pivot means operatively connecting one end of said lever with the said one end of the contactor bar, and spring means operating between the opposite end of said lever and a portion of said base and biasing said lever in a direction to engage said one end of said contactor bar with said contact bar.

MILAM C. BEANE.

REFERENCES CITED

The following references are of record in the file of this patent:

UNITED STATES PATENTS

| Number | Name | Date |
|---|---|---|
| 404,651 | Paca | June 4, 1889 |
| 1,127,442 | Horton | Feb. 9, 1915 |
| 1,470,717 | Fix | Oct. 16, 1923 |
| 1,917,104 | Ehrlich | July 4, 1933 |
| 1,984,921 | Ehrlich | Dec. 18, 1934 |
| 1,995,946 | Schild | Mar. 26, 1935 |